United States Patent [19]

Arruza

[11] 4,086,676
[45] May 2, 1978

[54] AUXILIARY SEAT ASSEMBLY FOR SPORT FISHING CHAIR

[75] Inventor: Antonio E. Arruza, West Palm Beach, Fla.

[73] Assignee: Sugar Supply, Inc., Belle Glade, Fla.

[21] Appl. No.: 805,406

[22] Filed: Jun. 10, 1977

[51] Int. Cl.² ............................................. B63B 29/00
[52] U.S. Cl. ............................................. 9/7; 248/429
[58] Field of Search ................ 297/188, 337; 248/424, 248/429; 9/7; 104/134

[56] References Cited

U.S. PATENT DOCUMENTS

| | | | |
|---|---|---|---|
| 3,151,910 | 10/1964 | Larson | 9/7 |
| 3,188,045 | 6/1965 | Fowler | 248/429 |
| 3,820,467 | 6/1974 | Burdick | 104/134 |
| 3,851,916 | 12/1974 | Quartullo | 9/7 |

Primary Examiner—Trygve M. Blix
Assistant Examiner—D. W. Keen
Attorney, Agent, or Firm—Stanley B. Kita

[57] ABSTRACT

A sport fishing chair for boats is provided with an auxiliary seat assembly which enables a fisherman to utilize a greater number of body muscles while reeling in a gamefish. The chair has a seat portion mounted to pivot on a pedestal, a rod holder in front of the seat portion, and a foot rest carried by the seat portion. The auxiliary seat assembly includes a base member secured to the seat portion of the chair, a support member superimposed on the base member for supporting the body of the fisherman, and means interposed between the seat and base members to afford sliding movement of the seat member from a retracted position overlying the chair seat to an extended position toward the foot rest. A body harness rests on the support member and is connected to the fishing reel. This structure enables a fisherman to move his body back and forth in the chair to pivot the rod and reel by alternately bending and straightening his legs. This enables the fisherman to utilize his body muscles to greater advantage in playing and landing a gamefish.

8 Claims, 8 Drawing Figures

U.S. Patent  May 2, 1978  Sheet 2 of 2  4,086,676
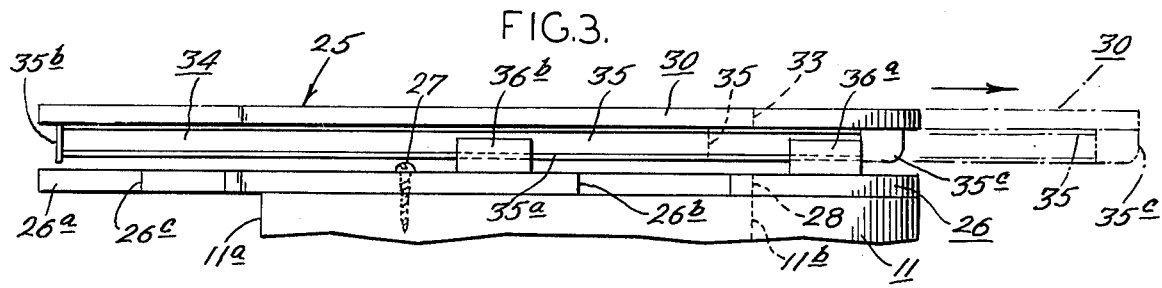
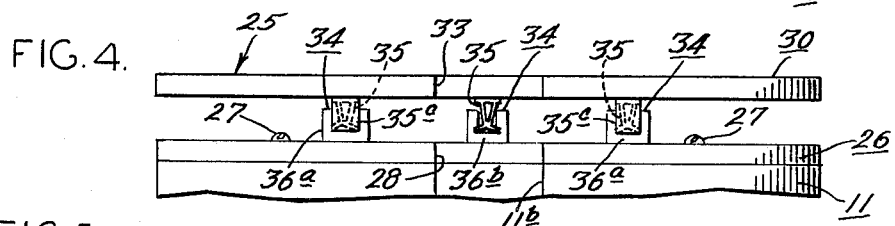
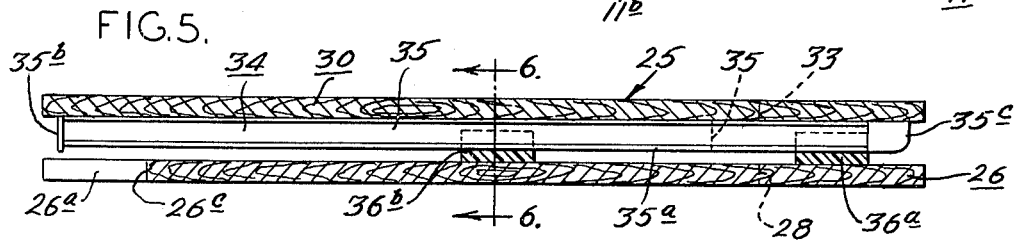
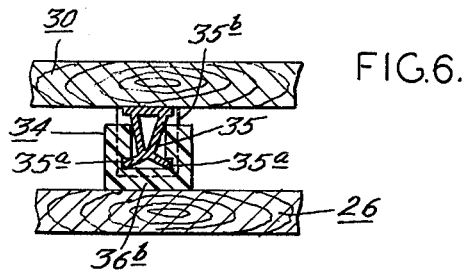
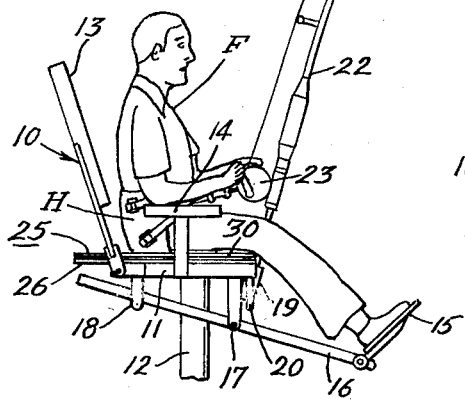
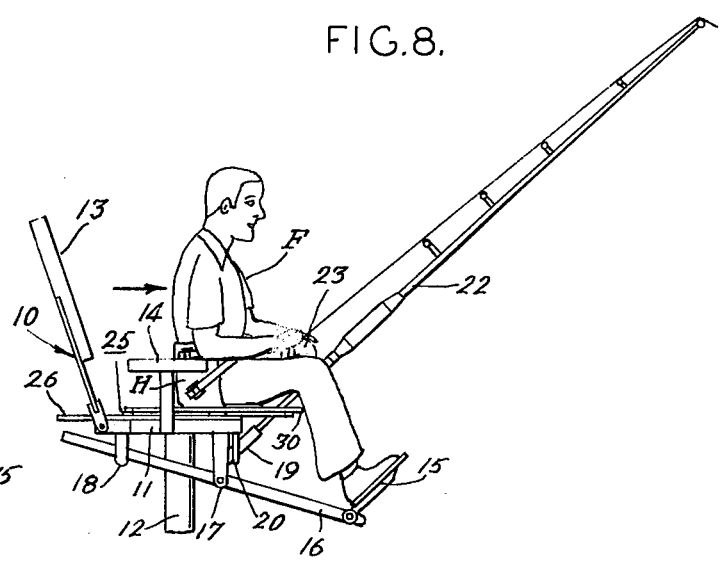

AUXILIARY SEAT ASSEMBLY FOR SPORT FISHING CHAIR

The present invention relates to sport fishing accessories, and more particularly, the present invention relates to accessories for use in combination with boat-mounted sport fishing chairs.

In fishing for gamefish such as: blue marlin, sailfish, swordfish and the like, it is customary for the fisherman to sit in a so-called fishing chair mounted on the aft deck of a power boat. The conventional fishing chair has an upstanding back rest and a seat both of which are mounted to pivot about an upright axis on a pedestal mounted to the boat deck. A foot rest extends outwardly from the seat portion of the chair to enable the fisherman to brace himself while landing a fish. A rod holder is mounted to the front of the chair for receiving the butt end of a fishing rod between the fisherman's legs. The rod holder is designed to pivot about a horizontal axis so that the fisherman may work the rod and reel back and forth while reeling in a fish. Customarily, the fisherman sits in a harness which is attached to the reel, and he usually uses his left hand to pump the rod. A lubricant such as a soap solution has been squirted on the chair seat to enable the fisherman and his seat harness to slide on the fishing chair; however, this is unsatisfactory because it requires the aid of an assistant to supply lubricant and because it limits the distance the fisherman can slide.

Landing one of the aforementioned gamefish species is a strenuous and time-consuming endeavor. Depending upon the size of the fish, it is not uncommon for even a muscular fisherman to spend 4 to 8 hours in landing the fish. Customarily, the fisherman employs his arms, shoulders and back muscles to pivot the rod rearwardly into an upright position, and while lowering the rod, he reels rapidly to maintain tension on the line while simultaneously shortening it. This procedure is effective; however, it has a tendency to overstress certain of the body muscles and to induce fatigue. Needless to say, a fishing chair which enables a fisherman to shorten the time required to land a gamefish and/or to land a gamefish with less muscle strain is highly desirable.

With the foregoing in mind, a primary object of the present invention is to provide a novel fishing chair accessory which enables a fisherman to land gamefish with a minimum of muscular strain and fatigue.

It is another object of the present invention to provide a unique fishing chair accessory which is of relatively simple construction yet which functions in use to facilitate the landing of gamefish.

A further object of the present invention is to provide a fishing chair having a structure which enables a fisherman to utilize his leg muscles to greater advantage while landing a gamefish.

Yet another object of the present invention is to provide a sliding seat assembly which enables a fisherman to use his leg muscles for moving his body back and forth to augment his upper body muscles while landing a fish.

Still another object of the present invention is to provide apparatus which functions to enhance fishing safety by enabling an angler to keep his left hand on top of the reel to prevent the rod and reel from snapping back in case the line breaks, thereby minimizing the possibility of the angler's being struck in the face by the rod.

More specifically, the present invention provides a seat assembly for use in combination with a fishing chair such as provided on sport fishing boats. The fishing chair comprises a seat mounted on top of a pedestal and having a rod holder which receives the butt end of a fishing rod to enable the rod to be pivoted back and forth between the legs of a fisherman when seated. A foot rest is carried by the seat to enable a fisherman to brace himself while landing a fish. The seat assembly comprises a base member fastened to the fishing chair seat, a support member superimposed on the base member for supporting the body of the fisherman, and means interposed between the support and base members to enable the support member to slide back and forth between a forwardly extended position adjacent the rod holder and a rearwardly retracted position overlying the chair seat. The base and support members are interconnected by means of parallel rails and guides which enable the support member to slide forwardly and to extend in cantilever fashion from the chair seat. A conventional body harness is used with the apparatus, the harness being supported on the support member and being connected by straps to the reel. Thus, when the fisherman straightens his legs, his body moves backward, causing the harness to pull on the reel and in turn to pivot the rod upwardly. With this structure, a fisherman is able to obtain better utilization of his muscles to shorten the time required to land a fish and/or to minimize muscle fatigue. Also, this enables the fisherman to keep his left hand on the reel at all times to that he may guard against the rod snapping back suddenly should the line break.

These and other objects, features, and advantages of the present invention should become apparent from the following description when taken in conjunction with the accompanying drawings in which:

FIG. 3 is a side elevational view of the seat assembly illustrated in FIG. 2;

FIG. 4 is a front elevational view of the seat assembly illustrated in FIG. 3;

FIG. 5 is a sectional view taken on line 5—5 of FIG. 2;

FIG. 6 is an enlarged sectional view taken on line 6—6 of FIG. 5; and

FIGS. 7 and 8 are side elevational views illustrating the manner in which the auxiliary seat assembly cooperates with the fishing chair to enable a fisherman to use his leg muscles to greater advantage while landing a fish.

Figure 1:
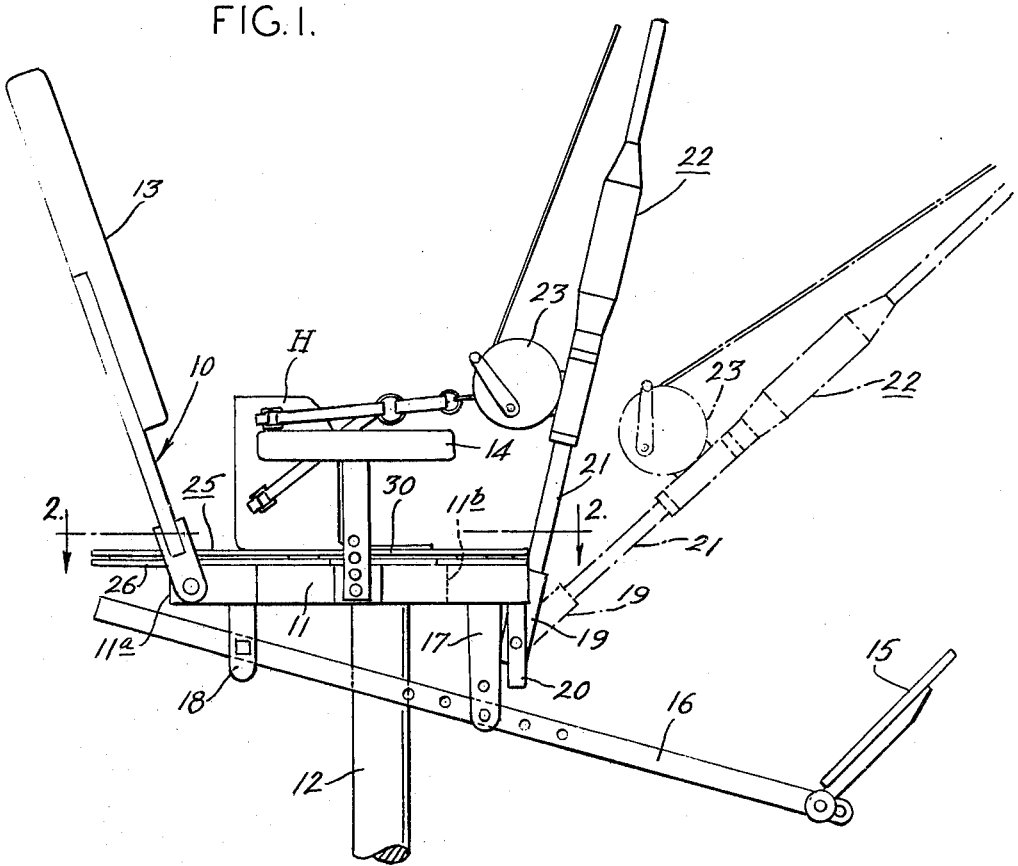
FIG. 1 is a side elevational view of a fishing chair having an auxiliary seat assembly embodying the present invention.

Referring now to the drawings, FIG. 1 illustrates a fishing chair 10 embodying the present invention. As best seen therein, the fishing chair 10 comprises a seat portion 11 mounted to pivot a vertical axis on a pedestal 12 adapted to be mounted at its lower end to the aft deck of a boat. The chair 10 also has an upwardly and rearwardly inclined backrest 3 adjustably mounted at its lower end to the rear of the chair seat 11. An arm rest 14 is mounted on each side of the chair seat 11. A foot rest 15 is disposed in front of the chair seat 11 and is inclined upwardly and forwardly below the level of the seat 11. The foot rest 15 is adjustably secured to the seat 11 by a pair of struts, such as the strut 16, which is releasably connected to a pair of stanchions 17 and 18 depending from the underside of the seat 11. A rod holder or gimbal 19 is mounted to pivot about a horizontal axis at the front center of the seat 11 by a depending bracket 20. The rod holder 19 receives the butt end 21 of a fishing rod 22 and enables the rod 22 to pivot back and forth between the full line position illustrated in FIG. 1 wherein the rod 22 is substantially upright and the broken line position illustrated in FIG. 1 wherein the rod 22 is inclined rearwardly. A conventional harness assembly H straps around the lower portion of a fisherman's body and is connected to the reel 23.

As described thus far, the fishing chair 10 and harness H are of conventional construction and design. As noted heretofore, the conventional fishing chair and harness combination have not been entirely satisfactory because much of the effort expended by the fisherman in landing a fish must be supplied by his upper body muscles. For instance, even though the harness H is connected to the reel 23, the substantial friction which exists between the bottom of the harness H and the top of the chair seat effectively prevents the fisherman from sliding backward on the seat unless an assistant is available to apply a lubricant, such as soap, periodically on the seat to minimize friction. As a result, the fisherman F tends to use his left hand to pull backward on the rod 22 while bending his body backward to gain line on the fish. Often, the backrest on the chair is removed to afford this type of rod pumping motion. Depending upon his physical condition, a fisherman may suffer muscle strain and/or muscle fatique after a relatively short period of time.

This procedure is not only tiring but is also dangerous. For example, it is customary to use 80 lb. test line when fishing for blue marlin, and when fishing for giant tuna or black marlin, 130 lb. test line is used. If a line breaks while the fisherman is pulling rearwardly, the rod can strike the fisherman in the face or head, and this has been known to cause skull fractures and broken teeth.

The aforementioned disadvantages of the conventional fishing chair are overcome by the present invention. To this end, the present invention provides apparatus which enables a fisherman to utilize a greater number of body muscles than heretofore possible. Hence, a fisherman is able to play and land a gamefish with less effort and body fatique. Also, the invention provides increased safety by freeing the angler's left hand to enable him to place it on top of the reel to prevent the rod and reel from snapping back and hitting the angler's face and/or head as can occur when the angler must use his left hand to pump the rod using conventional fishing techniques and equipment.

Referring again to FIG. 1, the apparatus of the present invention comprises an auxiliary seat assembly 25 adapted to mount onto the seat portion 11 of the conventional fishing chair 10. As best seen in FIGS. 3 and 4, the seat assembly 25 comprises a base member 26 fastened to the chair seat 11 as by screws or bolts 27,27. The base member 26 has a flat plan configuration substantially the same as the plan configuration of the seat 11, except for the fact that the base member 26 has a rearward extension or tail 26a extending beyond the rear end 11a of the chair seat 11. See FIGS. 1 and 3. The base member 26 is preferably fabricated of a flat piece of wood or other rigid material so as to lay flush against the topside of the chair seat 11.

Figure 2:
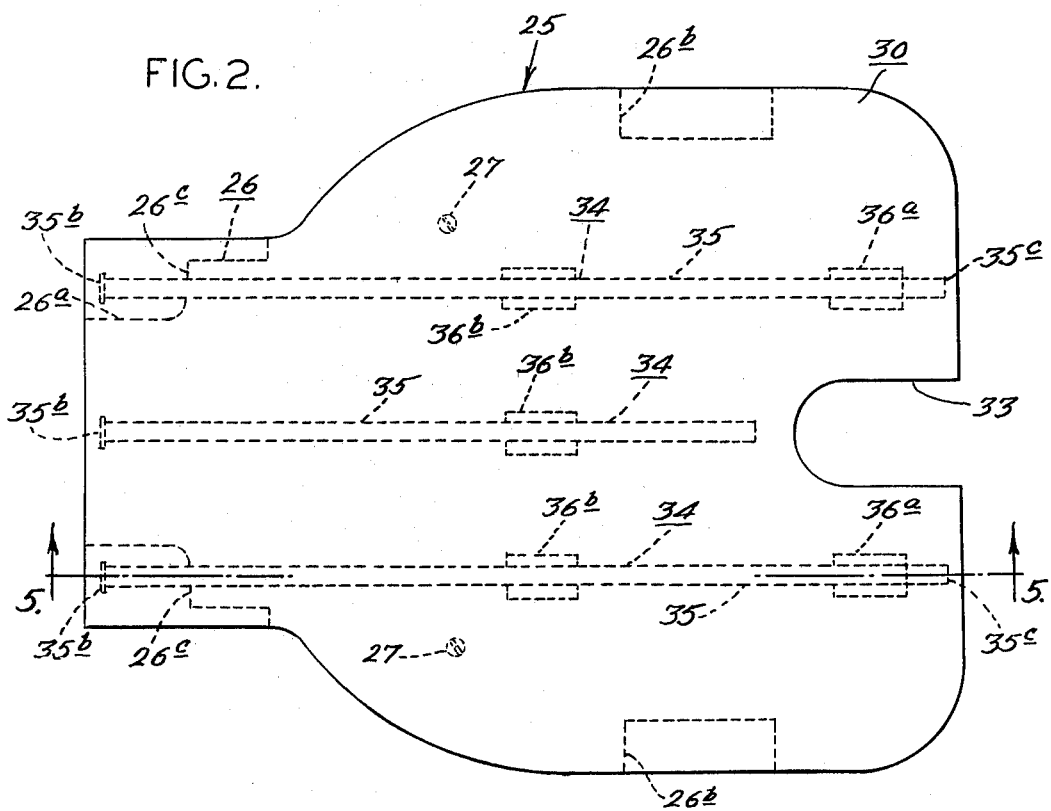
FIG. 2 is an enlarged plan view of an auxiliary seat assembly mounted on the seat portion of the fishing chair, the view taken on line 2—2 of FIG. 1.

A body support member 30 which is substantially congruent with the base member 26 is superimposed on top of the base member 26 to provide a relatively flat seat surface on which the fisherman may sit. The peripheral edge of the body support member 30 is illustrated in full lines in FIG. 2, and the peripheral edge of the base member 26 is illustrated in broken lines where its edge configuration differs. For instance, opposite sides of the base member 26 have cutouts 26b,26b which are provided to accommodate mounting plates for a pair of chairside rod holders. These rod holders have been omitted from the drawings since they do not form a part of the present invention. The base member 26 also has a pair of rear cutaways 26c,26c for accommodating certain conventional hardware at the rear of the chair seat 11, which hardware also has been omitted from the drawings.

As best seen in FIG. 3, the front of the chair seat 11 has a rearwardly extending notch 11b in registry with the rod holder 19. The notch accommodates the rod holder 19 when in its rearward limit position with the rod 22 projecting upright or slightly rearwardly from vertical. The base member 26 has a corresponding notch 28 which registers with the chair seat notch 11b, and the body support member 30 has a corresponding notch 33 which registers with the base member notch 28. Thus, the notches 33, 28 and 11b accommodate the rod holder 19 to enable the rod 22 to be pivoted into a substantially vertical position during fishing.

The seat member 30 is slid back and forth relative to the base member 26 by the fisherman when landing a fish. To this end, means is provided to mount the seat member 30 to the base member 26 in a manner affording relative sliding movement of the support member 30 forwardly in the direction indicated by the arrow in FIG. 3. In the present instance, the mounting means includes a plurality of rail and guide means interposed between the members 26 and 30 in such a manner as to mount the support member 30 for extension in cantilever fashion beyond the base member 26 in the manner illustrated in FIG. 8. In the illustrated embodiment, the slide means includes a series of three rail and guide assemblies 34,34 extending in a spaced parallel relation from front to rear between the members 26 and 30. Each of the rail and guide assemblies is of like construction to the other, except for the middle guide and rail assembly which is of a shorter length and has only one guide. See FIG. 2.

As best seen in FIG. 5, each rail and guide assembly includes an elongated rail 35 fastened to the underside of the support member 30 by screws (not shown) and a pair of axially spaced guide elements or bearings 36a and 36b fastened to the base member 26 by screws or the like and slidably receiving the rail 35. Preferably, the rail 35 is fabricated of extruded metal, such as aluminum, and the bearing or guide elements 36a and 36b are preferably fabricated of a low friction bearing material, such as nylon or the like. The rail 35 preferably has a cross-section such as illustrated in FIG. 6 with a pair of outturned flanges 35a,35a engaging in an inverted T-shaped slot in each bearing element. Thus, the support member 30 is slidably secured to the base member 26 but is not readily disengageable therefrom.

The rails 35,35 are substantially coextensive in length with the front to rear dimension of the support member 30, and the rear guide elements 36b,36b are located at about the midpoint of the base member 26. Thus, approximately one-half of the length of the rail 35 extends rearwardly beyond the rear guide element 36b when the support member 30 is in its retracted position illustrated in FIG. 5. This structure, however, permits the support member 30 to be extended forwardly in cantilever fashion in the direction illustrated by the arrow in FIG. 3 for a distance of about one-half the front to rear length of the chair seat 11.

The forward motion of the support member 30 is limited by means of stop elements, such as the stop element 35b provided on the rear end of each rail 35. In the illustrated embodiment, the stop element 35b is provided by welding or otherwise fastening a separate flange plate across the rear end of the rail 35. As best seen in FIG. 6, the stop element 35b is dimensioned so as to extend beyond the outline of the inverted T-shaped slot in the guide element 36. Preferably, the front end of each rail 35 is provided with a cap 35c,35c which may also be dimensioned so as to provide stops to limit rearward movement of the support member 30, although, such motion would be limited by engagement of the support member 30 with the backrest 13.

In using the seat assembly 25 when landing a fish, the fisherman F sits on the assembly 25 and in the chair 10 in the manner illustrated in FIG. 7. When so seated, the support member 30 is in its retracted position relative to the chair seat 11, and the legs of the fisherman F are disposed substantially straight when his feet are placed on the footrest 15. The harness H is strapped around the lower back of the fisherman F and is connected to the reel 23.

Assume for the moment that the above described position of the fisherman F exists when a fish strikes the line and bends the rod 22 in the manner illustrated. The sudden tension applied on the line by the fish causes the rod 12 to pull the fisherman forwardly in the chair due to the interconnection of the harness H with the reel 23. The fisherman F continues to move forwardly until the rod 22 reaches the downward position illustrated in FIG. 8. At this point the fisherman's legs are bent at about a 90° angle, and the support member 30 is in its forwardmost limit position, extending in cantilever fashion forwardly beyond the front edge of the chair seat 11.

To gain line on the fish, the fisherman F straightens his legs. This causes the harness H to move rearwardly, and this movement in turn pulls on the reel 23 and pivots the rod 22 in the counterclockwise direction. The harness H, of course, remains stationary on the support member 30; however, the support member 30 is able to slide with a minimum of friction relative to the chair seat 11. Since the support member 30 cantilevers forwardly beyond the front edge of the chair seat 11, the fisherman F is able to bend his legs sharply for obtaining a maximum amount of power from his legs when he straightens them. This structure also frees the fisherman's left arm so that he is able to place his hand on the reel 23 while fishing for preventing the rod 22 from snapping back and hitting him in the face or head in the event the line breaks. Thus, it should be apparent that the apparatus of the present invention functions both to minimize the effort required to land a fish and to maximize fishing safety.

While a preferred embodiment of the present invention has been described in detail, various modifications, alterations and changes may be made without departing from the spirit and scope of the present invention as defined in the appended claims.

I claim:

1. In combination with a pre-existing sport fishing chair having a seat portion, a foot rest portion spaced from said seat portion, means for holding a fishing rod and reel assembly adjacent the front of the seat portion, and harness means adapted to receive the lower back of a fisherman and to connect the fisherman to the rod and reel assembly, the improvement comprising: a body support member on which the fisherman sits in said harness means, a base member underlying said body support member, means fastening said base member to said seat portion of said chair, and interengaged guide and rail means intermediate said members mounting said body support member to said base member to afford extension of said support member in cantilever fashion beyond the front of said chair seat and reciprocation toward and away from said rod holding means, so that when the fisherman sits in the chair with the harness attached and alternatively bends and straightens his legs he reciprocates his body in opposite directions so that the harness is able to pull on the rod and reel assembly for augmenting the effort expended by his other body muscles to land a fish.

2. Apparatus according to claim 1 wherein said rail means includes a plurality of rails extending in spaced parallel relation on one of said members and said guide means includes a plurality of guides on the other of said members slidably engaged with said rails.

3. Apparatus according to claim 2 wherein said rails and guides have complementary transverse cross-sections interlockingly engaging one another to prevent vertical separation while affording said extension of said support member relative to said base member.

4. Apparatus according to claim 3 wherein said rails are mounted to said support member and said guides are mounted to said base member, and including stops on at least the rear ends of said rails to limit the forward travel of said support member.

5. Apparatus according to claim 4 wherein said base member and body support member have notches in registry with one another and with said rod holding means.

6. A seat assembly adapted to be installed on the seat portion of a pre-existing sport fishing chair, said seat assembly comprising: a base member adapted to mount onto the seat portion of the fishing chair, a body support member superimposed on said base member, and interengaged rail and guide means interposed between said members and mounting the members for sliding movement relative to one another, said rail means being substantially coextensive in length with said support member and said guide means being located relative to the base member to afford extension of the body support member from a retracted position overlying said base member into an extended position, extending in cantilever fashion beyond said base member.

7. A seat assembly according to claim 6 wherein said rail and guide means include a plurality of rails mounted in spaced parallel relation to the underside of said support member and a plurality of guides mounted on said base member and engaged with said rails, said rails and guides having complementary transverse cross-sections interlockingly engaging one another to prevent vertical separation thereof, and said rails having stops on the ends thereof to engage the guides for limiting forward and rearward motion of the support member relative to the base member.

8. A seat assembly according to claim 7 wherein said seat and base members are relatively flat and substantially congruent and said guides are fabricated of a low-friction material.

* * * * *